(12) United States Patent
Simer

(10) Patent No.: US 9,784,346 B1
(45) Date of Patent: Oct. 10, 2017

(54) TANK GAUGE PULLEY SYSTEM

(71) Applicant: Michael Simer, Big Spring, TX (US)

(72) Inventor: Michael Simer, Big Spring, TX (US)

( * ) Notice: Subject to any disclaimer, the term of this patent is extended or adjusted under 35 U.S.C. 154(b) by 545 days.

(21) Appl. No.: 13/902,809

(22) Filed: May 25, 2013

Related U.S. Application Data

(60) Provisional application No. 61/651,794, filed on May 25, 2012.

(51) Int. Cl.
*F16H 7/20* (2006.01)

(52) U.S. Cl.
CPC ..................... *F16H 7/20* (2013.01)

(58) Field of Classification Search
CPC .......... G01F 23/40; G01F 23/42; G01F 23/58; G01F 23/0023; G01F 23/0038; F16H 7/20; F16H 7/24; F16H 2007/185; F16H 55/49; F16H 55/50; G08B 21/182; Y10S 474/903; Y10T 137/8342
USPC ........................ 73/290, 321, 290 R
See application file for complete search history.

(56) References Cited

U.S. PATENT DOCUMENTS

| | | | | |
|---|---|---|---|---|
| 2,874,574 A * | 2/1959 | Patureau | ............... | G01F 23/263 73/321 |
| 4,459,584 A * | 7/1984 | Clarkson | ............... | G01F 23/46 137/558 |
| 6,022,286 A * | 2/2000 | Jackson | ............... | F16H 55/49 474/170 |
| 7,066,024 B2 * | 6/2006 | Watchel | ............... | G01F 23/0038 116/228 |
| 7,353,704 B2 * | 4/2008 | Clanton | ............... | G01F 23/42 242/615 |
| 2007/0012104 A1 * | 1/2007 | Clanton | ............... | G01F 23/42 73/313 |
| 2010/0122988 A1 * | 5/2010 | Clanton | ............... | G01F 23/0038 220/565 |

* cited by examiner

*Primary Examiner* — Daniel S Larkin
(74) *Attorney, Agent, or Firm* — Theodore F. Shiells; Shiells Law Firm P.C.

(57) ABSTRACT

A liquid level indicating system including a rope, cord or the like that is guided through a pulley system having at least two side-mounted pulleys attached to a bracket having an upstanding leg, the bracket being attached to floating roof of a liquid-containing tank or container. One end of the rope/cord is connected to either a floating roof in the tank or another object floating on the surface of a liquid contained within the tank or container. Another end of the rope/cord can be attached to an indicator that can visually show or output the level of a liquid within the tank or container. The rope/cord can be guided up and down through the pulley system and along the side of the tank or container simultaneously with the level of the floating roof in the tank or another object floating on the surface of a liquid. The side-mounted pulleys resist tangling and snagging of the rope, cord or the like while guided through the gauge device and permit easy maintenance.

13 Claims, 3 Drawing Sheets

TANK GAUGE PULLEY SYSTEM

BACKGROUND OF THE INVENTION

Field of the Invention

The present invention relates to pulley systems used in connection with devices for measuring the level of liquid in a storage tank. In particular, the present invention relates to a liquid level indicating system including a rope, cord or the like that is guided through a pulley system having at least two side-mounted pulleys attached to a bracket having an upstanding leg, the bracket being attached to floating roof of a liquid-containing tank or container, where one end of the rope/cord is connected to either a floating roof in the tank or another object 404 floating on the surface of a liquid 406 contained within the tank or container and another end of the rope/cord can be attached to an indicator 408 that can visually show or output the level of a liquid within the tank or container.

Description of Related Art

Pulley systems used in connection with devices for measuring the level of liquid in a storage tank are known. The storage tanks on which such devices are used are, in general, in exposed locations outdoors and are often in remote locations. These devices must operate to reliably indicate the level of the liquid for many years with little or no maintenance. Prior pulley systems employing center-mounted pulleys have been subject to failure from corrosion, dirt, jamming, tangling, etc. Thus, there is a need for a tank gauge device having a pulley system having a simpler design that is more reliable and decreases the amount of maintenance require.

SUMMARY OF THE INVENTION

The foregoing shortcomings of the prior art are overcome in accordance with an embodiment of the present invention, which provides a device useful to guide robe, cord, wire or the like comprising and an L-component having an L-shaped cross-section, the L-component being comprised of a longitudinally elongated upright member and a bottom member forming a generally right-angle with respect to each other. There further are two generally U-shaped brackets attached to the L-component and being spaced apart from each other, each of the U-shaped brackets having a bight and two outwardly extending legs; the legs supporting an axle of an axle-mounted pulley therebetween, the axles being supported so as to be generally mutually parallel. This embodiment further comprises a cover support member extending from the U-shaped brackets and above the pulleys; and an elongated protective cover, the cover being disposed over the L-component and U-shaped brackets, the cover having sides at the respective ends of the elongated cover, the sides having cut-outs or voids therein to allow a rope, cord or the like to move freely and unobstructed through the sides of the protective cover.

In accordance with an aspect of this embodiment, the cover support member comprises a nut and bolt fastening mechanism for securing said cover.

In accordance with another aspect of this embodiment, the elongated cover is a 5-sided generally rectangular box.

In accordance with another aspect of this embodiment, the protective box is substantially fabricated from sheet metal.

In accordance with another aspect of this embodiment, the L component is substantially fabricated from aluminum.

In another embodiment of the present invention, an improvement to a liquid level indicating system is providing comprising a rope, cord, wire or the like, one end of the rope, cord, wire or the like being connected to either a floating roof in the tank or another object floating on the surface of a liquid contained within the tank or container, and another end of the rope, cord, wire or the like is attached to an indicator that can visually show or output the level of a liquid within the tank or container, the improvement comprising a cord or rope guiding device comprising an L-component having an L-shaped cross-section, the L-component being comprised of a longitudinally elongated upright member and a bottom member forming a generally right-angle with respect to each other. There further are two generally U-shaped brackets attached to the L-component and being spaced apart from each other, each of the U-shaped brackets having a bight and two outwardly extending legs; the legs supporting an axle of an axle-mounted pulley therebetween, the axles being supported so as to be generally mutually parallel. This embodiment further comprises a cover support member extending from the U-shaped brackets and above the pulleys, and an elongated protective cover, the cover being disposable over the L-component and U-shaped brackets, the cover having sides at the respective ends of the elongated cover, the sides having cut-outs or voids therein allow a rope, cord or the like to move freely and unobstructed through the sides of the protective cover.

In accordance with an aspect of this embodiment, the cover support member comprises a nut and bolt fastening mechanism for securing said cover.

In accordance with another aspect of this embodiment, the elongated cover is a 5-sided generally rectangular box.

In accordance with another aspect of this embodiment, the protective box is substantially fabricated from sheet metal.

In accordance with another aspect of this embodiment, the L component is substantially fabricated from aluminum.

For a more complete understanding of an embodiment of a pulley-guided gauge device and the advantages thereof, reference is now made to the following detailed description taken in conjunction with the accompanying drawings, in which.

DETAILED DESCRIPTION

Figure 1:
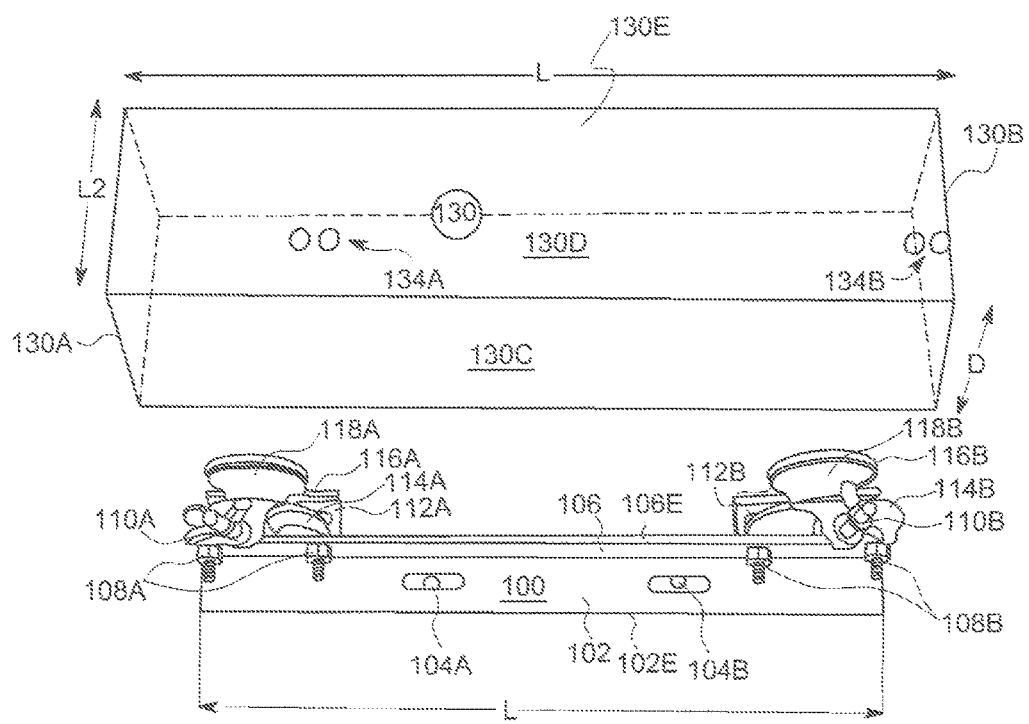
FIG. 1 is a top view in perspective of an embodiment of a pulley-guided tank gauge device depicting base component having a pulley system in accordance with an embodiment of the invention and a protective cover for the pulley system, the protective cover being shown removed an alongside the pulley system.

In the following discussion, numerous specific details are set forth to provide a thorough understanding of an embodiment of a gauge device. However, those skilled in the art will appreciate that the gauge device can be practiced without such specific details. In other instances, well-known elements have been illustrated in schematic diagram form in order not to obscure the gauge device in unnecessary detail. Additionally, for the most part, details concerning installation procedures, assembly, materials, and the like, have been omitted to the extent that such details are not considered necessary to obtain a complete understanding of an embodiment of a gauge device, and are considered to be within the understanding of persons of ordinary skill in the relevant art.

Turning now to the drawings in detail, a pulley system 10 in accordance with an embodiment of the invention has an "L" shaped component 100 (L-Component), which can be used as a base for the pulley system and for connecting the device to an external surface of a liquid-containing container or storage tank 400. The external surface can be either a moving surface, such as a floating roof, or a stationary surface, such as a side wall of the tank or container 400.

Reference numeral 102 represents the bottom member of the L-Component and reference numeral 106 represents the upright member of the L-Component; reference numeral 102E represents the side edge of said bottom member and reference numeral 106E represents the top edge of said upright member 106. Reference numerals 104A and 104B generally represent the oblong shaped holes through the bottom member of the L-Component that can be used for securing the base of the gauge device to the external surface of the container or storage tank with a nut and bolt combination or similar fastening mechanism.

Pulley system 10 includes at least two pulley sub-assemblies 118A and 118B, each of which can be comprised of a bracket component 112 having two upright sides 112L and 112R and a bottom side 112B (bight) which can be generally flush with bottom member 102. Bracket component 112 has a central axle 114 extending through and supported by upright sides 112L and 112R, and around which a pulley wheel 118 can rotate. The pulley sub-assemblies 118A and 118B can be connected or attached to the upright member 106 of the L-Component on the side opposite from the bottom member 102 by utilizing a bolt and nut combination, generally referenced by numerals 108A and 108B, or similar fastening mechanism.

Reference numerals 110A and 110B represent a nut and bolt combination located on top of one side of each of the bracket components which can be utilized to secure a protective cover over the working element.

Figure 2:
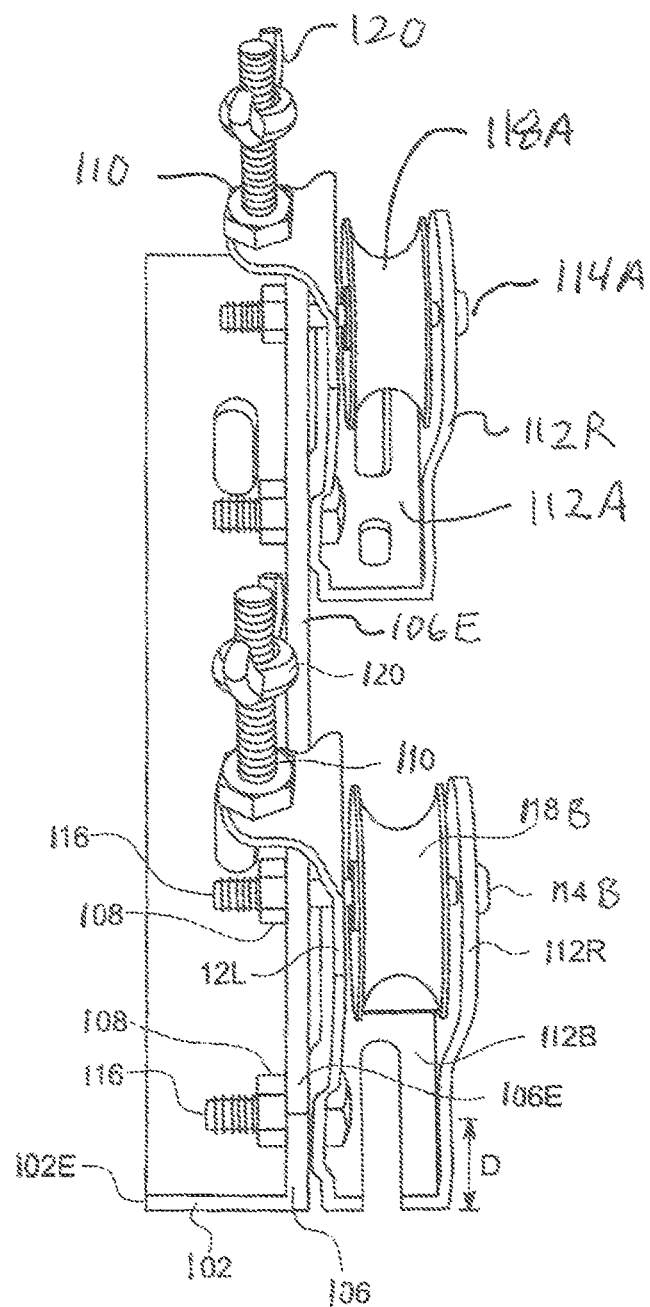
FIG. 2 is a top view, in isometric, of an embodiment of a pulley-guided tank gauge device depicting base component having a pulley system in accordance with an embodiment of the invention and a protective cover for the pulley system, the protective cover being shown removed an alongside the pulley system.
Figure 3:
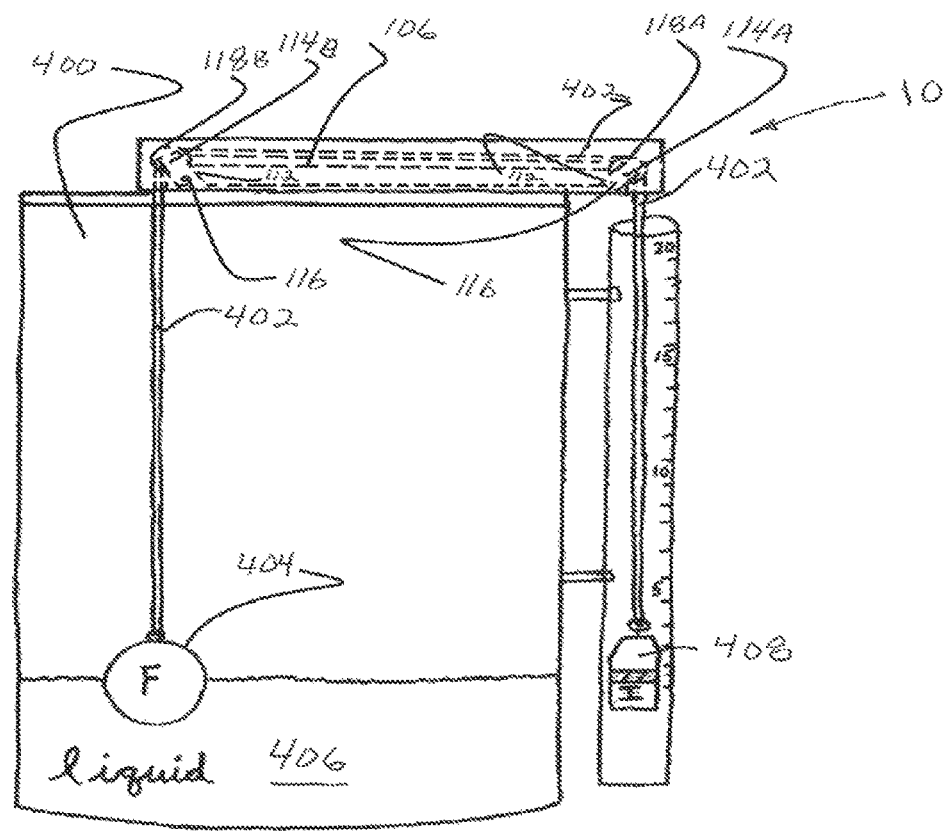
FIG. 3 is a side view, of an embodiment of a pulley-guided tank gauge device installed on a tank.

Turning now to FIG. 2, a close-up view of one pulley attached to one side of the upright member, reference numeral 106, of the L-Component of the pulley system 10 of the tank gauge device. The bottom member, reference numeral 102, of the L-Component can be used to secure the gauge device to the external surface of a container or tank and simultaneously acts as an anchor to balance this embodiment of the gauge device, providing more stability and reducing the risk of tangling the rope 402 cord or the like.

The pulley sub-assemblies 118A and 118B can be connected to the upright member 106 of the L-Component using a bolt and nut combination: reference numerals 108 and 116 represent the nuts and bolts, respectively, that secure the pulley's bracket to the upright element 106. Reference numeral 114 A and B represents the axle of the pulley and reference numeral 118A and B represents the wheel (FIG. 1, 118B) that rotates around the axle of the pulley, and reference numerals 112L, 112R, and 112B generally represent the left member (FIG. 1, 114B), the right member (FIG. 1, 116B) and the bottom member (FIG. 1, 112B), respectively, of the bracket containing the centralized axle 114 A and B around which wheel 118 of the pulley rotates.

In the embodiment of the gauge device depicted, a nut and bolt can act as the fastening mechanism that permits attachment of protective element or cover 130. As such, reference numeral 110 represents the bolt and numeral 120 represents the nut that secures the cover on the bolt and the entire pulley bracket/working element of the device.

Describing now the protective element, depicted in FIG. 1, reference numeral 130A refers to side A of the cover and numeral 130B refers to side B; side A is significantly parallel to side B, and both have a surface area of width by depth. Sides 130A and 130B can contain a cut-out or void space, which is not visible in the figures, in order to allow the rope, cord or the like to move freely and unobstructed through ends of the protective cover 130 without snagging or tangling. Sides 130A and 130B can be generally perpendicular to side 130C, top 130D, and side 130E. Side 130C and side 130E can be generally parallel and generally perpendicular to top 130D. Sides 130C and 130E have a surface area of length by depth, and top 130D has a surface area of length by width. It is not necessary to include a sixth, or bottom, side to the rectangular box of the protective cover element 130, because the surface to which the pulley system 10 is attached can essentially act as the sixth side.

Reference numerals 134A and 134B represent holes located through top 130D, which can be utilized to connect the cover 130 to the bolt and nut combination or similar fastening mechanism located on the working element at reference numerals 110A and 110B, respectively.

Various gauge device components can each be fabricated from suitable materials such as metal, natural or synthetic polymer, or other rigid plastic materials. Device components can also be finished with an exterior finish treatment, as required, to obtain or further enhance certain desired properties of each component. Desired properties of a specific component can vary according to the primary function of said component and therefore, the material of said component can differ depending on the desired properties. One desired property of all material potentially used to create the components of the device is strength and durability in order to withstand extreme outdoor weather and/or warehouse conditions and repetitive revolutions of the axle-wheel pulley system. This can be accomplished by utilizing an appropriate process for assembling and connecting various components of a gauge device, and by careful selection of the material used to create and/or finish applied to device components.

Having thus described the device, a pulley-guided tank gauge system, by reference to a certain of its preferred embodiments, it is noted that embodiments disclosed are illustrative rather than limiting in nature and that a wide range of variations, modifications, changes, and substitutions are contemplated in the foregoing disclosure and, in some instances, some features of a gauge device can be employed without a corresponding use of the other features. Many such variations and modifications can be considered desirable by those skilled in the art based upon a review of the foregoing description of preferred embodiments. Accordingly, it is appropriate that the appended claims be construed broadly and in a manner consistent with the scope of a gauge device.

What is claimed is:

1. A device useful to guide rope, cord or wire comprising:
    an elongated component comprised of a longitudinally elongated upright member and a bottom member forming a generally right-angle with respect to each other;
    two generally U-shaped brackets attached to the back side of said elongated component away from said bottom member and being-in direct line of sight of and spaced apart from each other and proximate to opposite ends of said elongated component, each of said U-shaped brackets having a lower bight and two outwardly extending legs extending from said lower bight on either side thereof; said legs supporting an axle of an axle-mounted pulley therebetween, said axles being supported so as to be generally mutually parallel, at least one of said legs of each U-shaped bracket being side-mounted to said longitudinally elongated upright member nearer to one horizontally distal end of said longitudinally elongated upright member than the at least one leg is to the middle of said longitudinally elongated member, by fasteners disposed below the axle supported by the U-shaped bracket;

a cover support member above said pulleys; and an elongated protective cover, said elongated protective cover being disposable over said elongated component and U-shaped brackets and attached to said elongated component.

2. The device according to claim 1 wherein said cover support member comprises a nut and bolt fastening mechanism for securing said elongated protective cover.

3. The device according to claim 1, where said elongated protective cover is a 5-sided generally rectangular box.

4. The device according to claim 3 wherein the 5-sided generally rectangular box is substantially fabricated from sheet metal.

5. The device according to claim 1 wherein the elongated component is substantially fabricated from aluminum.

6. An improvement to a liquid level indicating system for a tank comprising a rope or cord, one of said rope or cord being connected to an object floating on a liquid contained within the tank or container, and another end of the rope or cord is attached to an indicator that can visually show or output the level of a liquid within the tank or container, the improvement comprising a cord or rope guiding device comprising:

an elongated component comprised of a longitudinally elongated upright member and a bottom member forming a generally right-angle with respect to each other;

two generally U-shaped brackets attached to the back side of said elongated component away from said bottom member and being in direct line of sight of and spaced apart from each other proximate to opposite ends of said elongated component, each of said U-shaped brackets having a lower bight and two outwardly extending legs extending from said lower bight on either side thereof, said legs supporting an axle of an axle-mounted pulley therebetween, said axles being supported so as to be generally mutually parallel, at least one of said legs of each U-shaped bracket being side-mounted to said longitudinally elongated upright member nearer to one horizontally distal end of said longitudinally elongated upright member than the at least one leg is to the middle of said longitudinally elongated member, by fasteners disposed below the axle supported by the U-shaped bracket;

a cover support member above said pulleys; and an elongated protective cover, said elongated protective cover being disposable over said elongated component and U-shaped brackets and attached to said elongated component, said elongated protective cover having sides at the respective ends of said elongated protective cover.

7. The device according to claim 6 wherein said cover support member comprises a nut and bolt fastening mechanism for securing said elongated protective cover.

8. The device according to claim 6, where said elongated protective cover is a 5-sided generally rectangular box.

9. The device according to claim 8 wherein the 5-sided generally rectangular box is substantially fabricated from sheet metal.

10. The device according to claim 6 wherein the elongated component is substantially fabricated from aluminum.

11. A device useful to guide rope, cord or wire comprising:

an elongated component comprised of a longitudinally elongated upright member and a bottom member forming a generally right-angle with respect to each other;

two generally U-shaped brackets attached to the back side of said elongated component away from said bottom member and being-in direct line of sight of and spaced apart from each other and proximate to opposite ends of said elongated component, each of said U-shaped brackets having a lower bight and two outwardly extending legs extending from said lower bight on either side thereof; said legs supporting an axle of an axle-mounted pulley therebetween, said axles being supported so as to be generally mutually parallel, at least one of said legs of each U-shaped bracket being side-mounted to said longitudinally elongated upright member nearer to one horizontally distal end of said longitudinally elongated upright member than the at least one leg is to the middle of said longitudinally elongated member, by fasteners disposed below the axle supported by the U-shaped bracket;

a cover support member above said pulleys;

an elongated protective cover, said elongated protective cover being disposable over said elongated component and U-shaped brackets and attached to said elongated component, said elongated protective cover having sides at the respective ends of said elongated protective cover, wherein said cover support member comprises a nut and bolt fastening mechanism for securing said elongated protective cover, and wherein said elongated protective cover is a 5-sided generally rectangular box.

12. The device according to claim 11 wherein the 5-sided generally rectangular box is substantially fabricated from sheet metal.

13. The device according to claim 11 wherein the elongated component is substantially fabricated from aluminum.

* * * * *